(12) United States Patent
Yasue

(10) Patent No.: US 6,473,059 B1
(45) Date of Patent: Oct. 29, 2002

(54) DISPLAY DRIVER IC AND ELECTRONIC DEVICE USING SAME

(75) Inventor: Tadashi Yasue, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 273 days.

(21) Appl. No.: 09/619,471

(22) Filed: Jul. 19, 2000

(30) Foreign Application Priority Data

Jul. 23, 1999 (JP) .......................................... 11-208965

(51) Int. Cl.[7] .................................................. G09G 5/00
(52) U.S. Cl. .......................... 345/3.1; 307/71; 345/204
(58) Field of Search ........................ 345/1.1, 2.1, 204, 345/3.1, 3.2; 327/334; 326/41, 62; 307/77, 71

(56) References Cited

U.S. PATENT DOCUMENTS

| | | | | |
|---|---|---|---|---|
| 4,677,317 A | * | 6/1987 | Sakuma ........................ 326/81 |
| 4,970,687 A | * | 11/1990 | Usami et al. .......... 365/189.01 |
| 4,984,190 A | * | 1/1991 | Katori et al. ................ 709/237 |
| 5,233,350 A | * | 8/1993 | Khim .......................... 341/144 |
| 5,412,644 A | * | 5/1995 | Herberle ................ 340/825.65 |

FOREIGN PATENT DOCUMENTS

| | | |
|---|---|---|
| EP | 0 781 054 A2 | 6/1997 |
| JP | 7-13913 | 1/1995 |
| JP | A 7-13913 | 1/1995 |
| JP | 410268825 A | * 10/1998 |

* cited by examiner

Primary Examiner—Kent Chang
(74) Attorney, Agent, or Firm—Oliff & Berridge, PLC

(57) ABSTRACT

A display driver IC which adopts a serial transmission system to reduce the number of terminal pins, transmits a command and data efficiently and also can speed-up data transmission. The display driver IC comprises an interface circuit to which signals from an external MPU are input, a command decoder for decoding command data input from the external MPU through the interface circuit, a storage section in which display data input from the external MPU through the interface circuit is written; and a display driving section for driving a display on the basis of the display data written in the storage section. The interface circuit comprises a first input terminal to which a serial data input signal is input, a second input terminal to which a serial clock signal is input and a third input terminal to which a chip select signal is input. The serial data input signal uses, as a unit data column, 9 bits including data groups of 8 bits which the external MPU simultaneously processes and identification data D/C of one bit which identifies whether the data groups are groups of the command data or the display data.

8 Claims, 9 Drawing Sheets

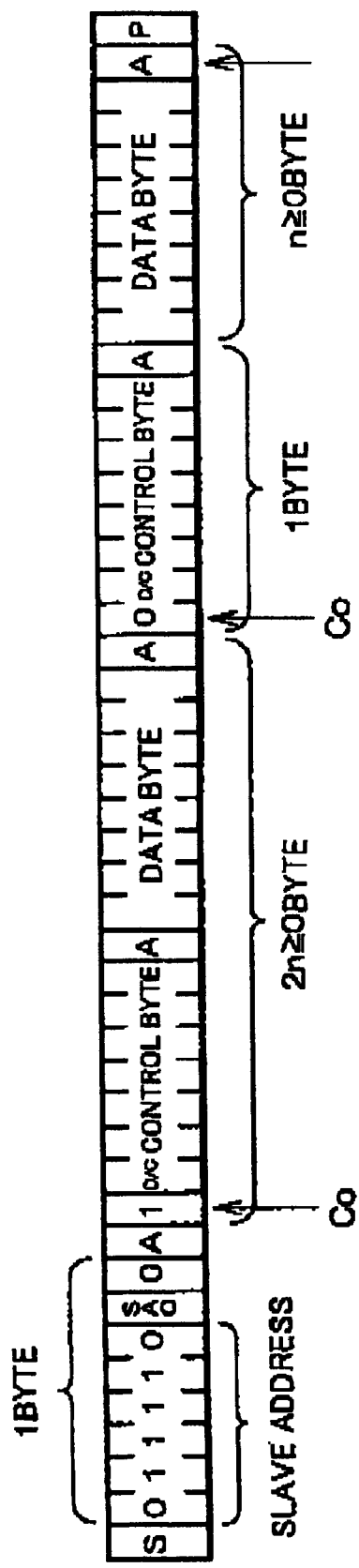
F I G. 8

DISPLAY DRIVER IC AND ELECTRONIC DEVICE USING SAME

BACKGROUND OF THE INVENTION

1. Field of the Invention

The present invention relates to a display driver IC (integrated circuit) using a serial interface and also relates to an electronic device using the display driver IC.

2. Description of Related Art

Recent high integration of a single chip micro-controller has enabled many peripheral ICs to be controlled by the single chip micro-controller. An unrestricted increase in the number of the terminals of the single chip micro-controller is not permitted for reasons peculiar to each peripheral IC and hence there is a physical restriction on the number of terminals permitted within the range of the chip size. For these reasons, serial transmission is made between the single chip micro-controller and the peripheral ICs to thereby reduce the number of mutual terminals.

As a serial transmission system of this type, an I²C bus is known. This I²C (Inter-Integrated Circuits) bus includes only two bus lines, namely, a bidirectional serial data line (SDA) and a serial clock line (SCL) with the intention of establishing effective mutual control between ICs.

FIG. 6 shows the original I²C bus protocol. One byte information following a start condition bit S consists of a slave address and a read/write designation bit. A slave address is a specific address for identifying a plurality of slave ICs connected to a bus of a single chip micro-controller which is a master.

Command data, display data and the like are transmitted in byte units subsequent to the one byte information including a slave address, as shown in FIG. 6. Each byte must be followed by an acknowledge bit A from a slave.

In FIG. 6, this one byte information which follows the one byte information including the slave address consists of a continuation bit C of one byte and command data of 7 bits. If the continuation bit C=0, this means that the data of 7 bits following the bit C is final command data, and if C=1, this means that other command data will further continue in one byte units. Then if necessary, display data is sent in byte unit after the final command data, and finally a stop condition bit P which is sent after an acknowledge bit terminates the transmission.

In the I²C bus protocol shown in FIG. 6, only 7 bits can be used for the command data since 1 bit in 1 byte is used as a continuation bit C. A technique in which a high order bit in data of one byte is used for another function in the above manner is also disclosed in Japanese Patent Application Laid-Open No. 7-13913. In this patent application, high order two bits in 1-byte serial data have a function of controlling the state of peripheral circuits, for example.

The I²C bus protocol shown in FIG. 7 and FIG. 8 is developed to make it possible to send command data of one byte or more.

Subsequent to the one byte information including a slave address and to an acknowledge bit A, two bytes information including a control byte and command data is sent, as shown in FIG. 7. Command bits of low order 8 bits in the latter command data and the remainder of the high order command bits in the former control byte enable to output command data comprising data of one byte (8 bits) and more. It is to be noted that the highest order bit C0 of the control byte functions as the continuation bit.

In FIG. 8, a D/C bit is provided as a second high order bit of a control byte to determine which of a command or data follows.

The I²C bus protocol comprises, as the multi-master-bus, all formats and procedures in a system, enabling specifications for controlling the bus by a plurality of micro-controllers as masters, for example, and hence it has high application flexibility. However, since many requirements must be fulfilled to control specific ICs, it is not always convenient to use the I²C bus protocol.

Meanwhile, the serial transmission system has the advantage that the number of terminals can be reduced to a greater extent than that of a parallel transmission system. However, this serial transmission system is inferior in speed of data transmission. In the actual situation, for example, an increase in the size of a liquid crystal screen cause liquid crystal display drivers or the like to be faced with demands for high speed data transmission.

However, the outlined I²C bus protocol is limited in the speed-up of data transmission. This is because one byte including a slave address is required to be located at the top of each byte of a command and data, and an acknowledge bit A sent from a slave IC is always required subsequent to individual one byte information. Because the information transmitted between the master and the slave is increased in this manner, speed-up of data transmission is limited. Moreover, presence of the acknowledge bit A decreases the transfer rate of serial clock signals and restricts the speed-up of data transmission because of the following reasons.

FIG. 9 shows a signal line L of a serial data line SDA. A source voltage VCC is applied to the signal line L via a pull-up resistance R1 and the signal line L has its own wiring capacitance C. A switch SW consisting of a MOS transistor is disposed on the side of a slave IC. This switch SW is turned on to discharge the charge of the signal line L1 to thereby drop the potential to 0 V, supplying the aforementioned acknowledge bit A from the slave IC to a master micro-controller. A resistance R3 shown in FIG. 9 is a total resistance (such as an ITO wiring resistance and a connector resistance) from a terminal of the IC to a substrate. At this time, since the switch SW has an on-resistance R2, a time depending on the time constant decided by the resistance R1, R2, and R3 and the wiring capacitance C, is required for discharging the signal line L1. It is therefore necessary to determine the frequency of the serial clock signal on the basis of the time constant. This frequency is 100 kHz in a standard mode, about 400 kHz in a fast mode, and about 3.4 MHz even in a high-speed mode.

In a semiconductor-manufacturing process used to realize a high performance micro-controller, progress is being made in miniaturization. Source voltage is decreased to a lower voltage level corresponding to the miniaturization in the process.

With the decrease in source voltage, the on-resistance R2 of the switch SW formed by a MOS transistor for sending the acknowledge bit A of the slave IC is increased. The time constant for discharging the signal line L1 is thereby increased. This also hinders the speed-up of data transmission.

Moreover, the pull-up resistance R1 and the resistance (R2+R3) divide the voltage to create a 0 level for the acknowledge bit A. The larger the resistance (R2+R3), the higher the potential at the 0 level and the smaller an allowable noise margin.

SUMMARY OF THE INVENTION

In view of the above situation, it is an objective of the present invention to provide a display driver IC which adopts a serial transmission system to reduce the number of terminal pins, transmits a command and data efficiently, and also can deal with the speed-up of data transmission and a reduction in the voltage of interface signals, and to provide an electronic device using the display driver IC.

According to a first aspect of the present invention, there is provided a display driver IC comprising:

an interface circuit to which signals from an external MPU are input;

a command decoder for decoding command data input from the external MPU through the interface circuit;

a storage section in which display data input from the external MPU through the interface is written; and a display driving section for driving a display on the basis of the display data written in the storage section, wherein the interface circuit comprises:

a first input terminal to which one unit data column of (N+1) bits is input serially, the one unit data column including data groups of N bits which are simultaneously processed by the external MPU and identification data of one bit which identifies whether the data groups are groups of the command data or the display data;

a second input terminal to which a serial clock signal is input; and a third input terminal to which a chip select signal is input.

According to this aspect of the present invention, when contents of the storage section in the display driver IC is changed, required signals can be transmitted to the display driver IC from the external MPU by using only the first to third input terminals. Namely, it is sufficient to serially transmit the command data, display data, and identification data for identifying the command data and display data from the external MPU to the display driver IC according to the serial clock signals after the display driver IC has been made to be accessible by the chip select signal.

A serial data input signal in this case has one unit data column of (N+1) bits, which consists of one bit identification data for the identifying the command data and display data and N-bit command or display data. Accordingly, as to the number of bits of the command data and display data, N bits which are simultaneously processed by the external MPU may be allotted.

In addition, unlike the foregoing I²C bus protocol, it is unnecessary for this display driver IC to send the acknowledge bit A every time data of N bits is input from the external MPU. It is therefore unnecessary to pull up a signal line to be connected to the first input terminal and to discharge the signal line so that the potential of the signal line becomes LOW every time information of N bits is input. It is hence possible to speed-up data transmission.

In this display driver IC, the interface circuit may comprise:

a frequency dividing circuit which divides a frequency of the serial clock signal in 1/(N+1) when the chip select signal is active;

an (N+1) bit shift register which sequentially shifts each bit data in the one unit data column of (N+1) bits on the basis of the serial clock signal and outputs the each bit data in the one unit data column of (N+1) bits in parallel when the chip select signal is active; and an (N+1) bit latch circuit which latches the one unit data column of (N+1) bits on the basis of the output of the frequency dividing circuit.

This structure enables data of (N+1) bits which is input serially to be subjected to serial-parallel conversion and the date to be latched onto every unit data column of (N+1) bits.

The command decoder may generate a timing signal which is supplied for writing the display data into the storage section, on the basis of the output of the frequency dividing circuit.

For instance, the command decoder can generate write signals on the basis of the output from the frequency dividing circuit, so that the supply of a write command from the external MPU is not required. Therefore, the load on the external MPU can be reduced and signal lines and input terminals for write signals can be omitted.

Moreover, the chip select signal may have a pulse which is non-active between continuous two unit data columns each having (N+1) bits during an active period. The frequency dividing circuit and the (N+1) bit shift register may be reset by this pulse.

Data can be latched by the (N+1) bit latch circuit on the basis of the output from the frequency dividing circuit in this manner, thus preventing an erroneous recognition of the border between unit data columns of (N+1) bits. As a result, a data transmission error can be reduced.

According to a second aspect of the present invention, there is provided an electronic device comprising:

the aforementioned display driver IC;

an MPU which supplies a chip select signal, a serial data input signal and a serial clock signal to the display driver IC; and a display section which is controlled by the display driver IC.

In this electronic device, only three pins are necessary for the external MPU to rewrite display data in the display driver IC, with the other pins being made available for other circuits to be controlled.

BRIEF DESCRIPTION OF THE DRAWINGS

FIG. 8 schematically illustrates a serial data column in accordance with the conventional I²C bus protocol of the third generation.

DETAILED DESCRIPTION OF THE PREFERRED EMBODIMENT

A preferred embodiment in which the present invention is applied to a liquid crystal device used for a portable telephone will be described with reference to the drawings.

(Outline of the entire liquid crystal device)

Figure 1:
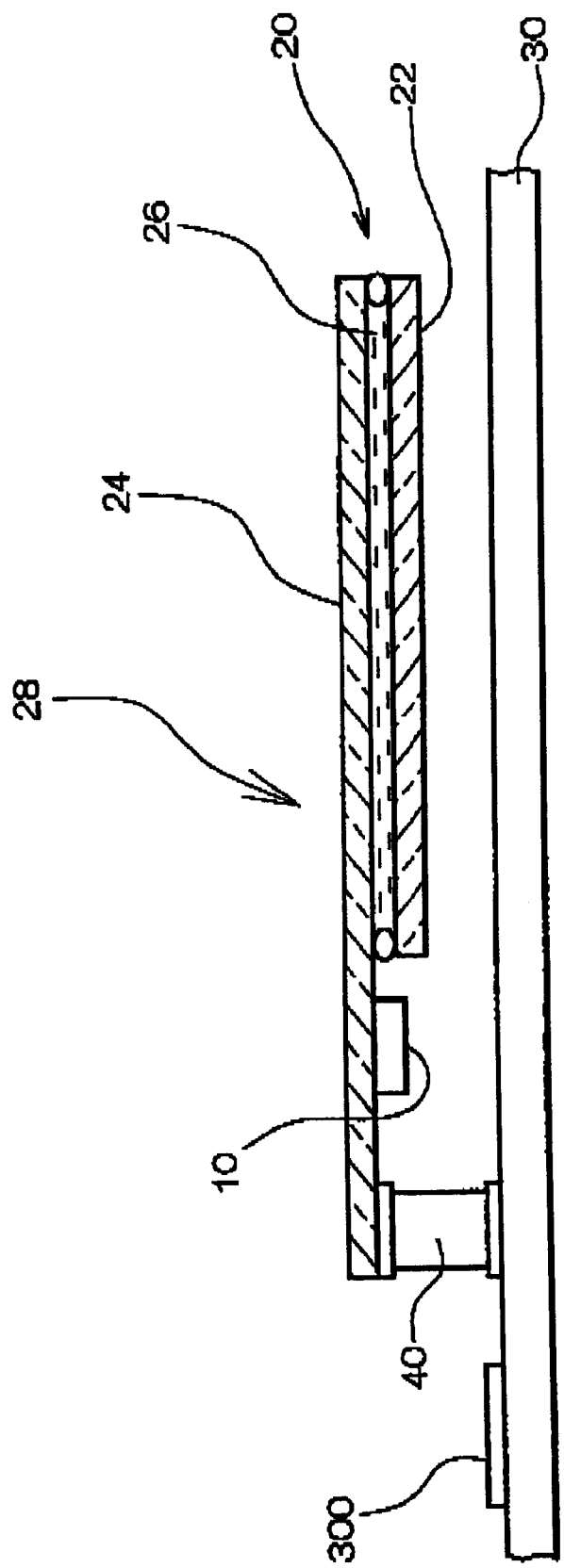
FIG. 1 is a schematic sectional view of a liquid crystal module provided with a liquid crystal display driver IC according to an embodiment of the present invention.

FIG. 1 is a schematic sectional view of a display section of a portable telephone. As shown in FIG. 1, the display section of the portable telephone comprises a liquid crystal module 20 with a liquid crystal display driver IC 10 mounted thereon, a print circuit board 30 with an MPU 300 mounted thereon, and a connecting section which electrically connects the liquid crystal module 20 to the print circuit board 30, specifically a rubber connecting section 40 (Zebra Rubber) which is obtained by forming a conductive section and an insulating section alternately, for example. The rubber connecting section has a structure in which the conductive section and the insulating section are alternately laminated, one over the other, in a direction from the rear surface to the front surface of FIG. 1. The terminals of the liquid crystal module 20 and the print circuit board 30 are electrically connected to each other by applying pressure uniformly in the longitudinal direction of the rubber connecting section 40.

The liquid crystal module 20 has a liquid crystal display section 28 having a structure in which a liquid crystal 26 is sealed between two glass substrates 22 and 24. The liquid crystal display driver IC 10 is mounted on the extended portion of the glass substrate 24. The liquid crystal module 20 forms a liquid crystal display device such as a simple matrix or an active matrix. In this embodiment, a segment electrode is formed on one of two glass substrates and a common electrode is formed on another glass substrate to constitute a simple matrix liquid crystal display device.

It is to be noted that the liquid crystal module 20 has a back light or a side light mounted thereon if it is used for a transmission type of liquid crystal display device, but requires no light source if it is a reflection type.

Figure 5:
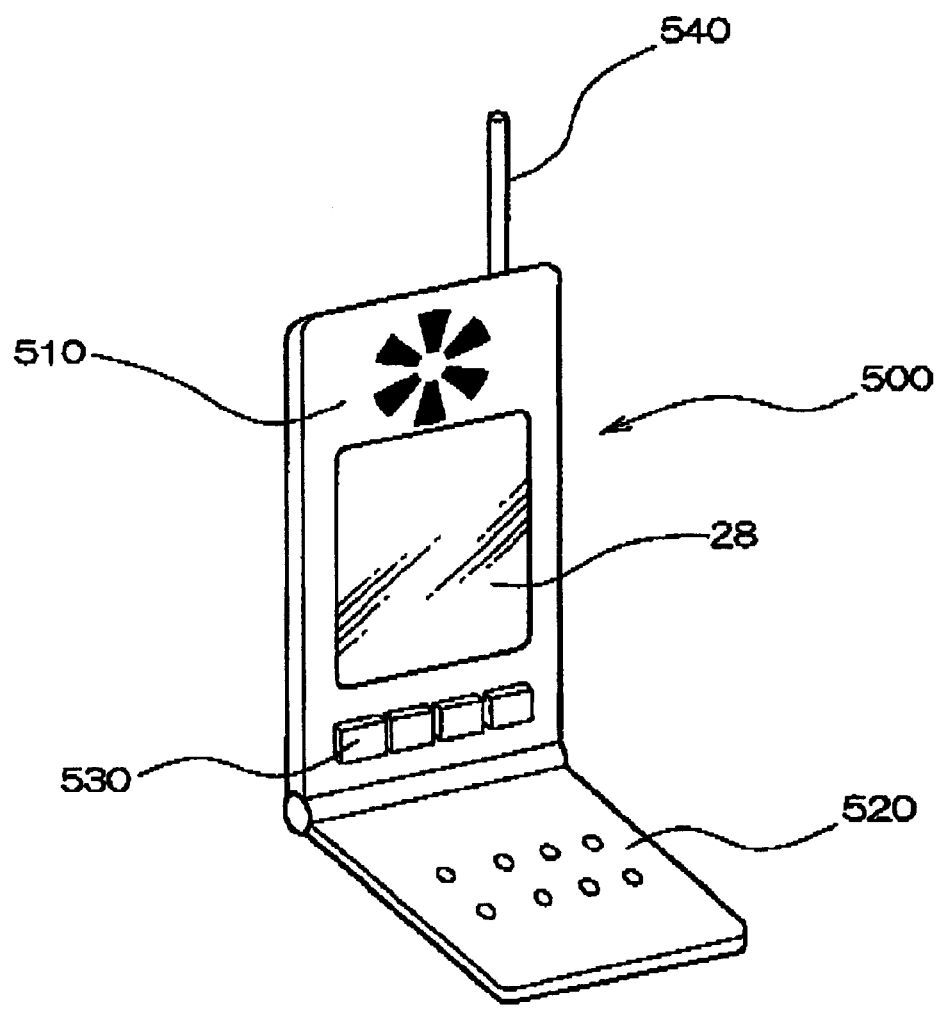
FIG. 5 is a schematic perspective view of a portable telephone as an example of an electronic device provided with the liquid crystal module shown in FIG. 1.
Figure 6:
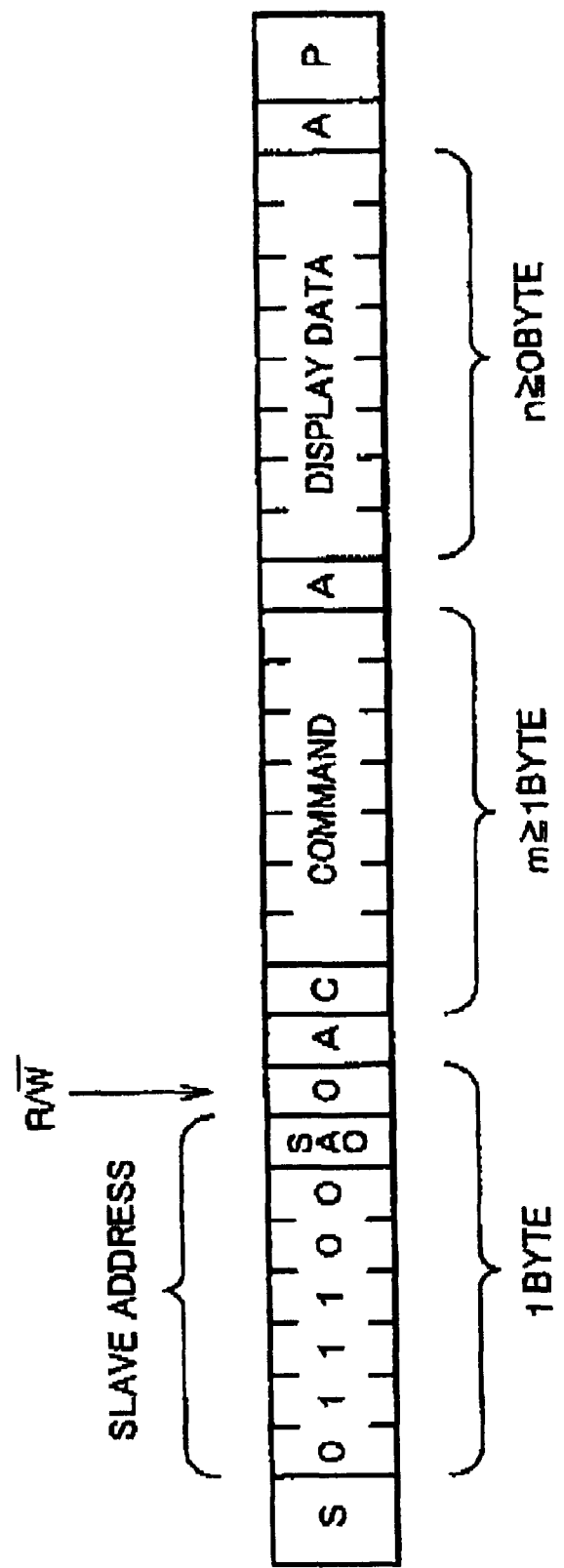
FIG. 6 schematically illustrates a serial data column in accordance with the conventional I²C bus protocol of the first generation.
Figure 7:
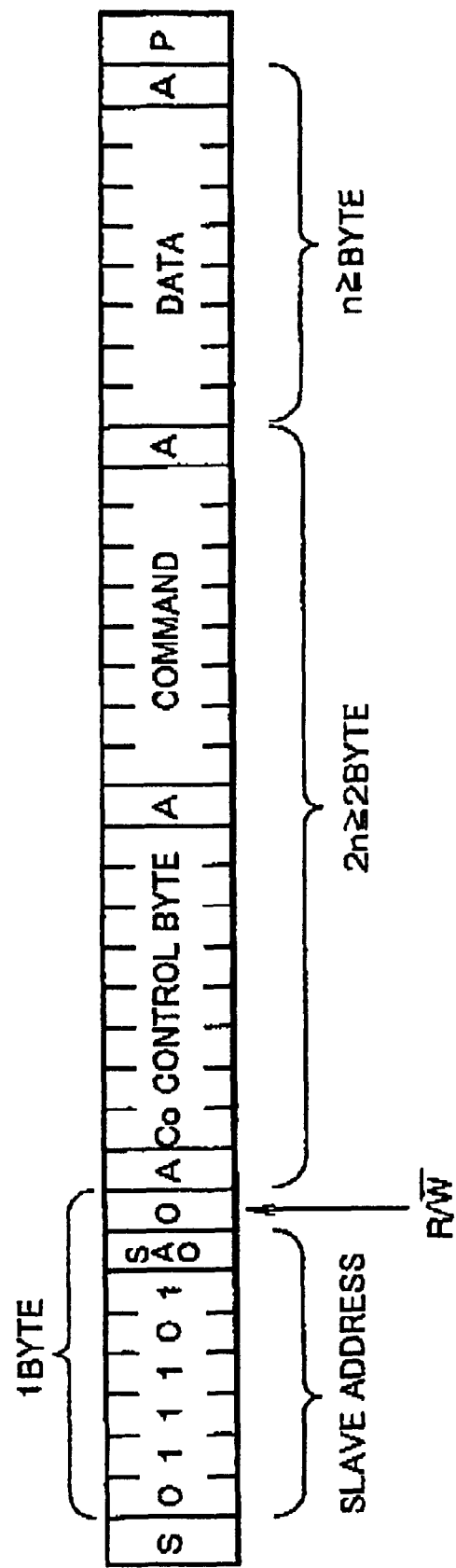
FIG. 7 schematically illustrates a serial data column in accordance with the conventional I²C bus protocol of the second generation.
Figure 9:
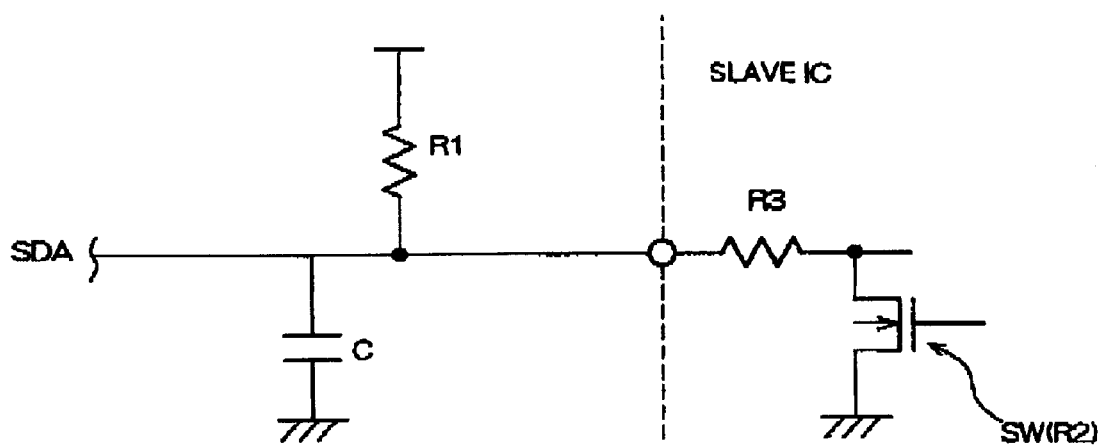
FIG. 9 schematically illustrates the structure of a signal line for sending an acknowledge bit shown in FIGS. 6 to 8.

As shown in FIG. 5, the liquid crystal module 20 is disposed in a portable telephone 500 so that the liquid crystal display section 28 is exposed. In addition to the liquid crystal display section 28, the portable telephone 500 comprises a receiving section 510, a transmitting section 520, an operating section 530, an antenna 540, and the like. The MPU 300 sends command data or display data to the liquid crystal module 20 on the basis of the information received by the antenna 540 or the information input by the operating section 530.

(Liquid crystal display driver IC)

Figure 2:
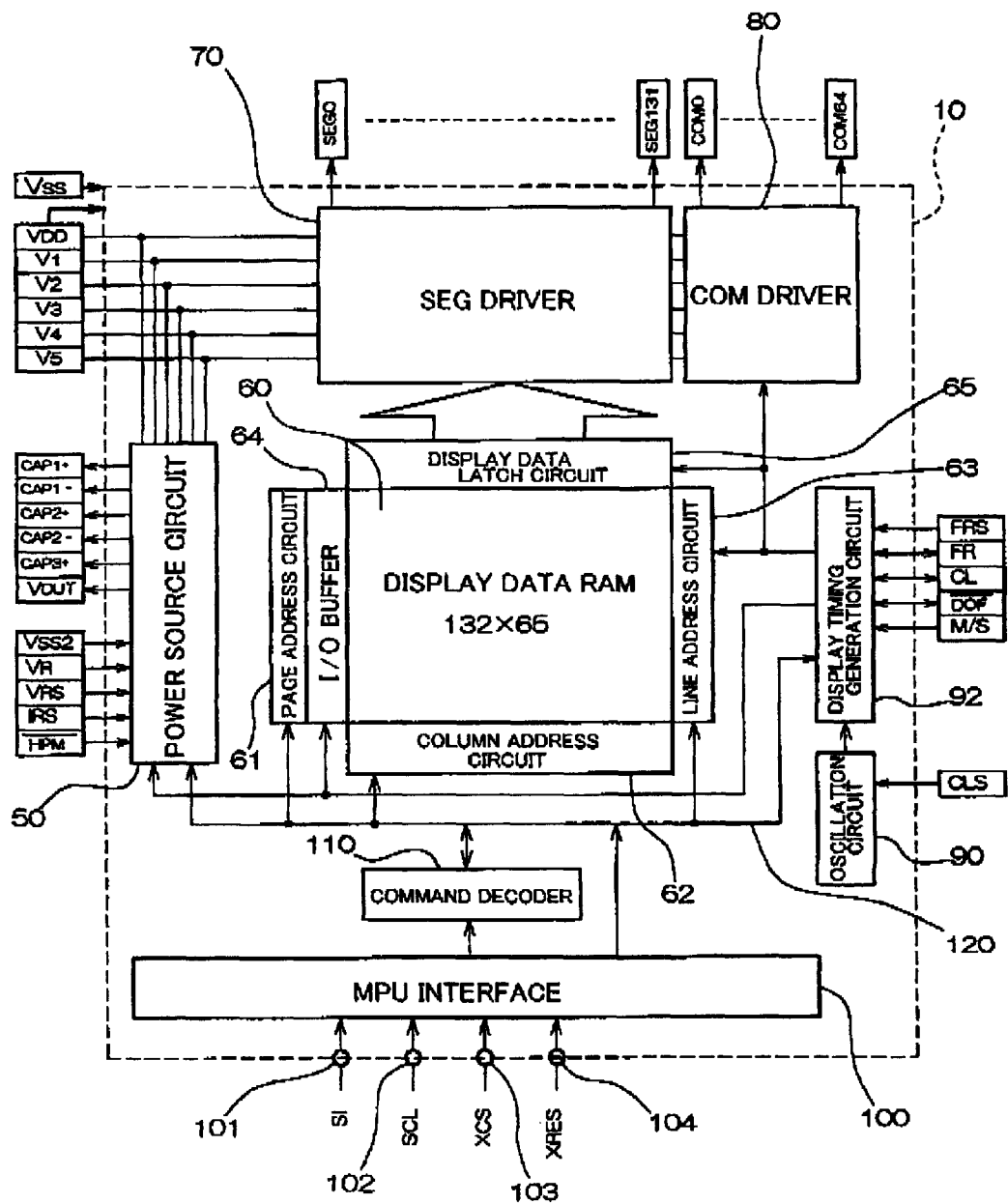
FIG. 2 is a block diagram of the liquid crystal display driver IC shown in FIG. 1.

FIG. 2 is a block diagram showing the liquid crystal display driver IC. In FIG. 2, the liquid crystal display driver IC 10 is provided with components for driving a liquid crystal such as a power source circuit 50, a display memory such as a display data RAM 60, a segment (SEG) driver 70 and a common (COM) driver 80 as display drivers, an oscillation circuit 90 and a display timing generation circuit 92. The display data RAM 60 includes memory elements equal in number (132×65) to pixels formed at the intersections of 132 segment electrodes SEG 0 to SEG 131 and 65 common electrodes COM 0 to COM 64.

The liquid crystal display driver IC 10 is further provided with an MPU interface 100, a command decoder 110, and an internal bus 120. In this embodiment, the MPU interface 100 has a first input terminal 101 to a fourth input terminal 104 for receiving various signals from the MPU 300. A serial data input signal (SI) such as command data and display data is input to the first input terminal 101, a serial clock signal (SCL) is input to the second input terminal 102, a chip select signal (XCS) is input to the third input terminal 103, and a reset signal (XRES) is input to the fourth input terminal 104.

Here, command data and display data input as serial data input signals (SI) are made up of the number of bits to be processed simultaneously by the MPU 300. The number of bits in this embodiment is 1 byte (8 bits). The number of bits of command data or display data may be one word (16 bits) or one long word (32 bits).

When the chip select signal (XCS) is active (e.g., LOW active), the MPU interface 100 receives the serial data input signal (SI) and makes a serial-parallel conversion of the serial data input signal to output the converted signal according to the serial clock signal (SCL).

The MPU interface 100 sends command data in parallel to the command decoder 110 if the serial data input signal (SI) is command data and sends display data in parallel to the internal bus line 120 if the serial data input signal (SI) is display data.

The decoded command data is used as operating commands for the power source circuit 50 and the display timing generation circuit 92 and is also used in addressing by each of a page address circuit 61, a column address circuit 62, and a line address circuit 63 which are connected to the display data RAM 60.

While, the parallel display data is written in memory elements according to the page and each address of the column, assigned by the command, through the internal bus 120 and an I/O buffer 64 of the display data RAM 60.

The display data RAM 60 functions as a field or frame memory of the liquid crystal display section 28 of the liquid crystal module 20. The display data written in the display data RAM 60 is read out through address assignment according to a timing signal from the display timing generation circuit 92 and latched by a display data latch circuit 65. The display data latched by the display data latch circuit 65 is converted into data of, for instance, five potential levels V1 to V5 required for driving a liquid crystal and supplied to the segment electrodes SEG 0 to SEG 131 of the liquid crystal display section 28.

An electric potential is supplied to the segment electrodes SEG 0 to SEG 131 based on timing signals from the display timing generation circuit 92 while switching the common electrodes COM 0 to COM 64, whereby the liquid crystal display section 28 is driven.

(Details of the MPU interface and input thereto)

Figure 3:
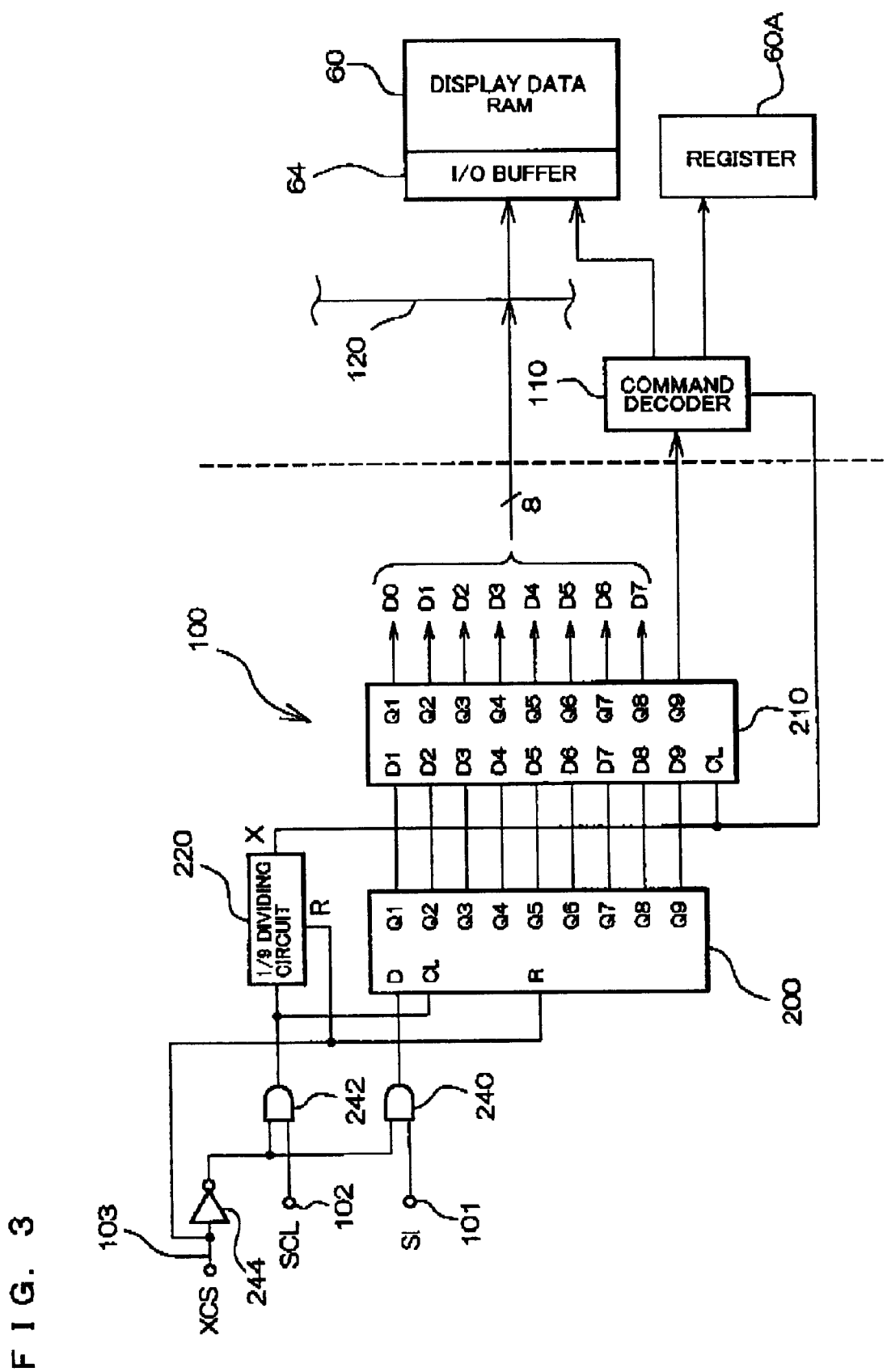
FIG. 3 is a block diagram of the MPU interface shown in FIG. 2.

FIG. 3 is a block diagram of the MPU interface 100. In FIG. 3, the MPU interface 100 comprises a 9 bit shift register 200, a 9 bit latch circuit 210, and a ⅑ frequency dividing circuit 220. The chip select signal XCS to be input through the third input terminal 103 is input to each reset terminal R of the 9 bit shift register 200 and the ⅑ frequency dividing circuit 220. The serial data input signal (SI) input to the first input terminal 101 is input to one input terminal of a first AND gate 240. The serial clock signal (SCL) input to the second input terminal 102 is input to one input terminal of a second AND gate 242. Signals obtained by inverting the chip select signal (XCS) by using an inverter 244 are input to another input terminal of each of the first and second AND gates 240 and 242. Accordingly, each logic of the serial data input signal (SI) and the serial clock signal (SCL) is output as is from the first and second AND gates 240 and 242 in the active period when the chip select signal (XCS) is LOW whereas when the chip select signal is non-active (HIGH), it is always set at LOW.

Figure 4:
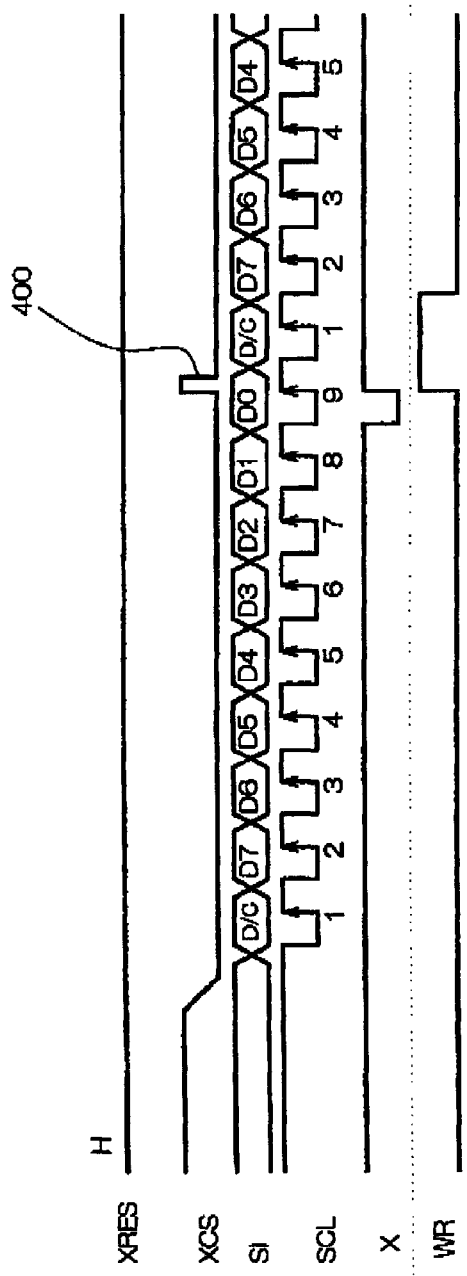
FIG. 4 is a timing chart of various input signals to the MPU interface shown in FIG. 3 and the output signals from a ⅑ frequency dividing circuit.

The serial data input signal (SI), serial clock signal (SCL), and chip select signal (XCS) which are respectively input to the first to third input terminals 101 to 103, and the output X of the ⅑ frequency dividing circuit 220 are shown in FIG. 4.

The chip select signal (XCS) is active in LOW as shown in FIG. 4. As the chip select signal is changed from HIGH to LOW, data can be transmitted to the liquid crystal display driver IC 10. The chip select signal (XCS) has a pulse 400 which is changed to HIGH every 9 clock signals of the serial clock signal (SCL) in the active period.

The serial data input signal (SI) is data using 9 bits as a unit data column. This unit data column is made up of a top bit D/C and data of 8 bits (1 byte). The top bit D/C identifies whether the succeeding data of 8 bits is command data or display data. If the top bit D/C=0, the succeeding data of 8 bits is command data and if the top bit D/C=1, the succeeding data of 8 bits is display data. When the MPU 300 converts the command or display data which is 8-bit parallel data into serial data, this identification data D/C is inserted into the top bit whereby this serial data input signal (SI) is generated.

The serial clock signal (SCL) serves as a clock signal to transfer the serial data input signal (SI).

Parallel data of 8 bits from output terminals Q1 to Q8 of the 9 bit latch circuit 210 is sent to the internal bus 120 and the identification data D/C from an output terminal Q9 is input to the command decoder 110. Based on the logic of the identification data D/C, whether or not the command decoder 110 accepts the data of 8 bits is decided. If the identification data D/C=0, the parallel data of 8 bits (command data) from the output terminals Q1 to Q8 of the 9 bit latch circuit 210 is accepted by the command decoder 110 and decoded. If the identification data D/C=1, the parallel data of 8 bits (display data) from the output terminals Q1 to Q8 of the 9 bit latch circuit 210 is input to an I/O buffer 64.

The output X of the 1/9 frequency dividing circuit 220 is supplied to the command decoder 110. The output X is decoded by the command decoder 110 to thereby serve as a write signal WR for the display RAM 60 and as a clock signal which for setting a register 60A (see FIG. 3) which sets a page address in the page address circuit 61, for example.

The reset signal XRES to be input to the fourth input terminal 104 of the MPU interface 100 is used to stop the action of the liquid crystal module 20.

(Operation of liquid crystal display driver IC)

With regard to the portable telephone 500 shown in FIG. 5, the case of displaying a telephone number list by operating an operating section 530, for example, will be described. In the following description, a display section such as time display is running on and the reset signal (XRES) is non-active (HIGH), as shown in FIG. 4. At this time, even if the chip select signal (XCS) is non-active to be in HIGH, display driving is continued in the liquid crystal display section 28 on the basis of the image information stored in the display data RAM 60 shown in FIG. 2.

Here, when information is input through the operating section 530, the MPU 300 makes the chip select signal (XCS) of the liquid crystal display driver IC 10 active so that an image based on the input information is displayed on the liquid crystal display section 28 and also serially sends the command data and the display data synchronously with the serial clock signal.

In the active period when the chip select signal (XCS) is LOW, the 1/9 frequency dividing circuit 220 of the liquid crystal display driver IC 10 divides a frequency of the serial clock signal (SCL) in 1/9 as shown in FIG. 4. In FIG. 4, an output X of the 1/9 frequency dividing circuit 220 is changed from HIGH to LOW at the eighth fall of the system clock (SCL).

This 1/9 frequency dividing circuit 220 is reset when the chip select signal (XCS) becomes HIGH. The chip select signal (XCS) has a pulse 400 which is changed to HIGH after the shift register 200 takes in data D0 at a rise of the serial clock signal SCL and the latch circuit 210 latches data D0 to D9 at a rise of the output X of the 1/9 frequency dividing circuit 220. The 1/9 frequency dividing circuit 220 is therefore reset by the pulse 400.

Also, in the active period when the chip select signal (XCS) is LOW, the 9 bit shift register 200 shifts sequentially the serial data input signals (SI) input to the data input terminal D at the rise of the serial clock signal (SCL) input to the clock terminal CL, and outputs these shifted signals in parallel from the output terminals Q1 to Q9.

The output X from the 1/9 frequency dividing circuit 220 is input to the clock terminal CL of the 9 bit latch circuit 210. The 9 bit latch circuit 210 takes in the data from the output terminals Q1 to Q9 of the 9 bit shift register 200 at a rise (or at the ninth rise of system clock signal (SCL) shown in FIG. 4) of the pulse 400 in which the output X is changed from LOW to HIGH and latches the data until the output X becomes LOW again.

Because data can be latched by the 9 bit latch circuit 210 on the basis of the output X from the 1/9 frequency dividing circuit 220 in this manner, an erroneous recognition of the border between unit data columns of 9 bits can be avoided. As a result, data transmission errors can be reduced.

As a consequence, the 8-bit data D0 to D7 is output in parallel from the terminals Q1 to Q8 of the 9 bit latch circuit 210 and the identification data D/C is output from the output terminal Q9.

The 8-bit data D0 to D7 are input to the command decoder 110. Here, whether or not the command decoder 110 accepts the 8-bit data D0 to D7 from the terminals Q1 to Q8 of the 9 bit latch circuit 210 is decided based on the logic of the identification data D/C. Then, the command data is decoded by the command decoder 110 and the display data is input to the I/O buffer 64.

Command data may include high order two bits among 8-bit data assigned as the identification bits which identifies a command. In this case, when the high order two bits are 0 and 1, it is recognized by the decoder 110 that the low order 6 bits are, for example, a page address and then the address of 6 bits is set in a register. In addition, there may be a case where all of one byte data is a command parameter without any identification bit for command, or a case where a command of plural bytes such as two byte command includes one byte as the identification bits for command and the successive one byte as a parameter.

The output X of the 1/9 frequency dividing circuit 220 is also input to the command decoder 110 where the write signal WR shown in FIG. 4 is generated. The write signal WR is input to the I/O buffer 64 and used as a write timing signal for transferring the display data supplied to the I/O buffer 64 to the display data RAM 60.

The write signal WR is also supplied to a page address register (not shown) of the page address circuit 61 and is also utilized as a clock signal for setting a page address of 6 bits in the page address register.

In this embodiment, as outlined above, when it is intended to change the display screen of the liquid crystal display section 28, necessary signals can be transferred from the MPU 300 to the liquid crystal display driver IC 10 by using only the first to third input terminals 101 to 103. Namely, after the liquid crystal display driver IC 10 is put into an accessible state by the chip select signal (XCS), it is sufficient to serially transmit the command data, the display data and the identification data D/C for identifying these data, from the MPU 300 to the liquid crystal display driver IC 10 according to the serial clock signal (SCL).

Here, the serial data input signal (SI) has a unit data column, wherein the unit is 9 bits consisting of D/C bits for the command and display data identification and one byte command or display data. Accordingly, one byte (8 bits) which is simultaneously processed by the MPU 300 may be allotted as the number of bits of the command data and display data.

In addition, unlike the foregoing I²C bus protocol, it is unnecessary for the liquid crystal display driver IC 10 to send the acknowledge bit A every time information of one byte is input from the MPU 300. It is therefore unnecessary to pull up a signal line connected to the first input terminal and to discharge the signal line to the LOW state every time information of one byte is input. It is hence possible to speed-up the data transmission.

Moreover, the write signal WR or the like can be generated based on the output X of the ⅑ frequency dividing circuit 220 and hence the supply of write commands from the MPU 300 is not required. Therefore, the load of MPU 300 is reduced and also signal lines and input terminals for write signals can be omitted.

The present invention is not limited to the embodiments described above. Many modifications and variations are possible without departing from the spirit and scope of the present invention. For instance, in the aforementioned embodiments, one byte (8 bits) is used for command or display data, and the number of bits of the unit data column of the serial data input signal (SI) is designed to be 9. The present invention is by no means limited to these bit numbers. When the number of bits for the command or display data is increased to one word (N=16 bits) or one long word (N=32 bits), the number of bits of the unit data column of the serial data input signal (SI) may be designed to be (1+N). At this time, the number of bits of each of the shift register 200 and the latch circuit 210 is designed to be (1+N), and the frequency dividing circuit 220 is designed to divide into 1/(1+N).

Also, the present invention may be applied to the case in which customers can switch from serial input to parallel input and vice versa with respect to the input of the command data, the display data and the like. This is because operations in accordance with the present invention can be implemented at least during a serial input.

The display driver IC of the present invention is not necessarily limited to those used for liquid crystal display and may be applied to various other types of display devices. The electronic devices according to the present invention are not limited to portable telephones but may be applied to various other types of electronic devices which accept the input of serial data to drive liquid crystal or other display sections.

What is claimed is:

1. A display driver IC comprising:
    an interface circuit to which signals from an external MPU are input;
    a command decoder for decoding command data input from the external MPU through the interface circuit;
    a storage section in which display data input from the external MPU through the interface circuit is written; and
    a display driving section for driving a display on the basis of the display data written in the storage section,
    wherein the interface circuit comprises:
        a first input terminal to which one unit data column of (N+1) bits is input serially, the one unit data column including data groups of N bits which are simultaneously processed by the external MPU and identification data of one bit which identifies whether the data groups are groups of the command data or the display data;
        a second input terminal to which a serial clock signal is input; and
        a third input terminal to which a chip select signal is input.

2. The display driver IC as defined in claim 1, wherein the interface circuit comprises:
    a frequency dividing circuit which divides a frequency of the serial clock signal in 1/(N+1) when the chip select signal is active;
    an (N+1) bit shift register which sequentially shifts each bit data in the one unit data column of (N+1) bits on the basis of the serial clock signal and outputs the each bit data in the one unit data column of (N+1) bits in parallel when the chip select signal is active; and
    an (N+1) bit latch circuit which latches the one unit data column of (N+1) bits on the basis of the output of the frequency dividing circuit.

3. The display driver IC as defined in claim 2,
    wherein the command decoder generates a timing signal which is supplied for writing the display data into the storage section, on the basis of the output of the frequency dividing circuit.

4. The display driver IC as defined in claim 2,
    wherein the chip select signal has a pulse which is non-active between continuous two unit data columns each having (N+1) bits during an active period; and
    wherein the frequency dividing circuit and the (N+1) bit shift register are reset by the pulse.

5. An electronic device comprising:
    a display driver IC;
    an MPU which supplies a chip select signal, a serial data input signal and a serial clock signal to the display driver IC; and
    a display section which is controlled by the display driver IC;
    wherein the display driver IC comprises:
        an interface circuit to which signals from the MPU are input;
        a command decoder for decoding command data input from the MPU through the interface circuit;
        a storage section in which display data input from the MPU through the interface circuit is written; and
        a display driving section for driving a display on the basis of the display data written in the storage section; and
    wherein the interface circuit comprises:
        a first input terminal to which one unit data column of (N+1) bits is input serially, the one unit data column including data groups of N bits which are simultaneously processed by the MPU and identification data of one bit which identifies whether the data groups are groups of the command data or the display data;
        a second input terminal to which the serial clock signal is input; and
        a third input terminal to which the chip select signal is input.

6. The electronic device as defined in claim 5, wherein the interface circuit comprises:
    a frequency dividing circuit which divides a frequency of the serial clock signal in 1/(N+1) when the chip select signal is active;

an (N+1) bit shift register which sequentially shifts each bit data in the one unit data column of (N+1) bits on the basis of the serial clock signal and outputs the each bit data in the one unit data column of (N+1) bits in parallel when the chip select signal is active; and an (N+1) bit latch circuit which latches the one unit data column of (N+1) bits on the basis of the output of the frequency dividing circuit.

7. The electronic device as defined in claim 6, wherein the command decoder generates a timing signal which is supplied for writing the display data into the storage section on the basis of the output of the frequency dividing circuit.

8. The electronic device as defined in claim 6, wherein the chip select signal has a pulse which is non-active between continuous two unit data columns each having (N+1) bits during an active period; and wherein the frequency dividing circuit and the (N+1) bit shift register are reset by the pulse.

* * * * *